Patented June 16, 1936

2,044,297

UNITED STATES PATENT OFFICE 2,044,297

MANUFACTURE OF FERTILIZER

Herman L. Hartenstein, Chicago, Ill.

No Drawing. Application November 10, 1933, Serial No. 697,469

4 Claims. (Cl. 71—9)

This invention relates to the utilization of immature corn or maize, sorghum and other plants of a grain producing type for the production of fertilizer.

Plants of this character or class contain a considerable amount of nitrogen and potassium as well as other desirable elements and compounds, particularly valuable in the manufacture of fertilizer, which I have discovered may be used as the basic constituents thereof, either by themselves, or to which may be added mineral or other substances, such for instance as solution of nitrogen bearing material in the form of ammonia, or urea, or both in water, as well as gas house liquor, and also solid nitrogen and ammonia carriers.

The major portion of the nitrogen and potassium as well as of the other substances in the plants are taken up by them during the early period of their growth before maturity thereof, particularly in soils containing high or excessive quantities of available potash, as for instance lands upon which silt containing potassium and other plant food elements has been and continues to be deposited as the result of frequent overflows of rivers or inundation. As the growing and maturing process proceeds, a portion of these substances are usually disseminated into the grain or corn, large percentages of the nitrogen and potash being lost through fermentation and leaching, with the result that the percentage of such plant substances at full maturity or the heretofore usual time of harvesting, in the plants or stalks themselves, is greatly reduced from the percentage contained in the stalks, stems and leaves before complete maturity of the plants.

It is therefore one of the objects of the present invention to conserve and utilize as much of these substances as possible, particularly at the period of growth when the plants contain their maximum percentages of nitrogen and potash, as well as the quantity or amount which would otherwise be disseminated into the ears, grain or seed or lost by leaching, fermentation and weathering, if the plant should be allowed to reach the grain or ear producing stage before being harvested.

To that end the invention consists essentially in cutting, or harvesting the plants before the grain is produced, preferably before or about the tasseling stage, which would usually be from say within sixty to ninety days after the planting of the same, according to the nature of the land in which it is planted and the progress of the growth of the plant, but in any event before the production of the grain or ear.

The plant after being cut is then shocked and cured in the field in the usual manner, so as to partially reduce the water content, after which it is processed in accordance with this invention.

In carrying the present invention into operation it is preferable to grow the plants in soil which contains large quantities of available or efficient potash and the entire plant consisting of stalks, stems and leaves are ground, cut and recut, or otherwise reduced to a fine state or condition of any desired or suitable mesh, and then ammoniated or nitrated, if desired, by adding ammonia or nitrogen carrying compounds, either liquid or solid. Minerals, such as gypsum or calcium sulphate, and phosphorous bearing material, either raw or processed acidulated may be mixed therewith, when such additions are desired.

The plants are cut and ground by passing through an ordinary cutting or grinding machine, and the mixing may be effected either by use of an ordinary mixing machine, or in bins, or otherwise, as desired, and the ammoniating and nitrating as well as processing may also be effected in mixing machines, in bins, or in any other suitable manner.

If the mixture is prepared in bins, plant material and ground gypsum or ground phosphate rock may be arranged in alternate layers.

Fermentation then takes place and the mass is allowed to stand in bins, if the material is in a fine state, for several weeks, but if the plant material is in a coarser state, a longer period of time for digesting or fermentation will be required, care being taken to prevent the temperature generated during that time from rising over about 80° to 170° F.

After the fermentation stage, the product or fertilizer may be used, or undesirable moisture remaining in the mass may be removed, or the material dried in any suitable or well known manner.

One example of the product produced in accordance with the principles of this invention, and the quantities and proportions of the material to be employed, is as follows.

About two thousand (2,000) pounds of ground or reduced plant material, on a dry basis, approximately three hundred (300) pounds of gypsum, approximately three hundred (300) pounds of phosphate rock, and the equivalent of twenty (20) pounds of nitrogen in the form of either liquid ammonia or other nitrogen carriers.

If desired, potassium bearing material or potash, and any desired quantity thereof may be added to the mass either before or after the fermentation period.

Another illustration of a product produced in accordance with the principle of this invention, provides that if dry treatment is desired, the plant material is harvested and field cured and ground or cut to the desired degree of fineness, and then thoroughly dried, preferably, at approximately a temperature under 200° F., as the low drying temperature is preferable to prevent other actions than drying from taking place.

If modification of nitrogen content is desired, one or more certain solid nitrogen carriers such as ammonium nitrate, leuna saltpeter, ammonium chloride, ammonium phosphate, ammonium sulphate, or urea in any proportion desired, may be mixed with the ground and well dried plant material, if an acidulous material is desired.

Likewise, calcium nitrate, cyanamid, or ammonium phosphate may be added if an alkaline material is desired.

As the retention by soil of all these materials are rated either low or medium, losses in the soil will be prevented when such nitrogen carriers are thoroughly incorporated or mixed with the organic vegetable material, while the latter will also be benefited.

The phosphorus content may be modified with the addition of any substances containing phosphorus or phosphoric acid in available or efficient form, as for instance acidulated, processed superphosphates of any grade.

The potassium content may be increased by the addition of muriate of potash, sulfate of potash or any of the commercial forms of potassium bearing materials.

The plant material when well dried usually contains approximately four per cent of nitrogen and four per cent of potash, rated as oxide, together with other useful soil and plant food elements.

As an example of the dry treatment, the addition of from one-half per cent to three per cent of nitrogen in the form of any of the above mentioned solid or liquid nitrogen carriers, and from one per cent to twelve per cent of phosphoric acid in the form of superphosphate, or treble superphosphate and the like, and if desired potash, may be added, for special purposes, but other proportions of the materials may be used.

While some examples of this invention have been given, it is to be understood that various changes may be made therein, and also in the steps of the process, and in lieu of raw phosphate rock, acidulated, processed, or superphosphate may be used, and other changes and substitues may be made within the scope of the claims, without departing from the spirit of this invention.

What is claimed as new is:

1. The steps in the method of producing fertilizer from immature plants of the grain producing group which consists in harvesting the plants when the nitrogen and potash content therein is at a maximum and partially reducing the water content by subjecting the plants to the atmosphere, then reducing the plants to small parts, introducing therein liquid ammonia, allowing the mass to stand for a period of time to ammoniate the same to cause the nitrogen content present to exist in a water-soluble form as well as water-insoluble form, and finally drying and grinding the product.

2. The method of manufacturing fertilizers from immature corn plants which consists in harvesting the plants when the nitrogen and potash content is at a maximum, partially reducing the water content by subjecting the plants to the atmosphere, reducing them to small parts, then mixing therewith a nitrogen bearing material, allowing the mixture to stand for a period of time sufficient to nitrogenize the mass and have the nitrogen content of the product in both water-soluble and partly water-insoluble form, and the potash in available organic vegetable form, and finally drying and grinding the product.

3. The method of manufacturing fertilizer from immature corn plants which consists in harvesting the plants when the nitrogen and potash content is at a maximum, partially reducing the water content by subjecting the plants to the atmosphere, and reducing them to small parts, then admixing therewith a processed phosphorus bearing material, allowing the mixture to stand while introducing therein ammonia carriers, for a period of time sufficient to ammoniate the mass and have the nitrogen present in both water-soluble and partly water-insoluble form, and the potash in available organic form, and finally drying and grinding the product.

4. The steps in the method of manufacturing fertilizer from immature corn plants which consists in harvesting the plants previous to the corn formation period and when the nitrogen and potash content therein is at a maximum, and reducing the water content or sap by subjecting them to the atmosphere, then reducing the plants to small parts, introducing ammonia carrying solutions, allowing the composition to stand for the purpose of ammoniating the same and to cause the potash content to exist in organic vegetable form available for crops, and the nitrogen content in both water-soluble and partly water-insoluble form, and the potash in available organic form, and finally drying and grinding the product.

HERMAN L. HARTENSTEIN.